US010830628B2

(12) United States Patent
Cleyet et al.

(10) Patent No.: US 10,830,628 B2
(45) Date of Patent: Nov. 10, 2020

(54) OIL LEVEL SENSOR TANK FOR TURBINE ENGINE

(71) Applicant: SAFRAN AERO BOOSTERS SA, Herstal (BE)

(72) Inventors: Florian Cleyet, Liege (BE); Alain Beaujean, Oreye (BE); Stéphane Bougelet, Profondeville (BE)

(73) Assignee: SAFRAN AERO BOOSTERS SA, Herstal (BE)

(*) Notice: Subject to any disclaimer, the term of this patent is extended or adjusted under 35 U.S.C. 154(b) by 199 days.

(21) Appl. No.: 15/969,134

(22) Filed: May 2, 2018

(65) Prior Publication Data

US 2018/0321073 A1 Nov. 8, 2018

(30) Foreign Application Priority Data

May 3, 2017 (BE) .................................. 2017/5310

(51) Int. Cl.
*G01F 23/22* (2006.01)
*F01D 25/18* (2006.01)
(Continued)

(52) U.S. Cl.
CPC ............. *G01F 23/22* (2013.01); *B64D 37/02* (2013.01); *B64D 37/04* (2013.01); *B64D 37/06* (2013.01); *F01D 25/18* (2013.01); *F01M 11/12* (2013.01); *F16N 19/003* (2013.01); *G01F 23/0061* (2013.01); *G01F 23/26* (2013.01); *F05D 2220/30* (2013.01); *F05D 2230/60* (2013.01); *F05D 2260/98* (2013.01);
(Continued)

(58) Field of Classification Search
CPC ...... G01F 23/22; G01F 23/242; G01F 23/248; G01F 23/268; B64D 37/04; B64D 37/06; F01M 11/12; F16N 19/003
See application file for complete search history.

(56) References Cited

U.S. PATENT DOCUMENTS 3,771,287 A * 11/1973 Sunderland ............ B01D 19/00
96/187
2005/0127924 A1* 6/2005 Motzer ................... B08B 1/008
324/644
(Continued)

FOREIGN PATENT DOCUMENTS

CN   102627150 A   8/2012
EP   0143167 A1    6/1985
(Continued)

OTHER PUBLICATIONS

Search Report dated Jan. 16, 2018 for BE 201705310.

*Primary Examiner* — Paul M. West
(74) *Attorney, Agent, or Firm* — James E. Walton

(57) ABSTRACT

An oil tank of a turbine engine, particularly of an aircraft turbojet includes an external wall forming a generally curved main cavity. This cavity includes an arched sensor for electrically measuring the oil level, for example in a capacitive manner. Said arched sensor matches the curvature of the main cavity in order to be integrated therein. Sensor supporting arms distributed along the curvature of the arched sensor and/or an arched sleeve with an arched cavity receive the arched sensor. A turbine engine is provided with an oil tank, as well as a method for mounting a sensor in an oil tank.

6 Claims, 5 Drawing Sheets

(51) Int. Cl.
*G01F 23/26* (2006.01)
*F16N 19/00* (2006.01)
*G01F 23/00* (2006.01)
*F01M 11/12* (2006.01)
*B64D 37/02* (2006.01)
*B64D 37/04* (2006.01)
*B64D 37/06* (2006.01)
*G01F 23/24* (2006.01)

(52) U.S. Cl.
CPC ...... *F16N 2210/02* (2013.01); *F16N 2250/18* (2013.01); *G01F 23/24* (2013.01); *G01F 23/263* (2013.01)

(56) References Cited

U.S. PATENT DOCUMENTS

| | | | |
|---|---|---|---|
| 2010/0326048 A1 | 12/2010 | Lozier et al. | |
| 2014/0159944 A1* | 6/2014 | Fredriksson | G01S 7/02 342/124 |
| 2015/0075132 A1 | 3/2015 | Snecma | |

FOREIGN PATENT DOCUMENTS

| | | |
|---|---|---|
| EP | 2720006 A1 | 4/2014 |
| FR | 3035919 A1 | 11/2016 |
| FR | 3036792 A1 | 12/2016 |
| JP | S59126214 A | 7/1984 |

\* cited by examiner

OIL LEVEL SENSOR TANK FOR TURBINE ENGINE

This application claims priority under 35 U.S.C. § 119 to Belgium Patent Application No. 2017/5310, filed 3 May 2017, titled "Oil Level Sensor Tank for Turbine Engine," which is incorporated herein by reference for all purposes.

BACKGROUND

1. Field of the Application

The present application relates to the field of the measurement of the liquid level in a turbine engine tank. The present application also relates to an axial-flow turbine engine, particularly a plane turbojet or an aircraft turboprop. The present application also relates to the mounting of a liquid level sensor in a tank.

2. Description of Related Art

The precise measurement of the oil level in a turbojet in flight provides safety. By performing this measurement in the tank, the lubricant endurance can be assessed, and a situation where there is a lack of this fluid can be anticipated. The document CN102627150A discloses an oil tank for a plane engine. The tank has a rectangular body in which an electric level detector is placed. This liquid level detector is placed axially along the main elongation of the body of the tank. An automatic control system is connected to the level detector in order to precisely assess the oil consumption.

Furthermore, a turbojet requires the compactness of each of the members thereof to be optimized. Increasing the capacity, and therefore the height of the tank, results in giving a curved shape thereto.

The document US2010/0326048A1 discloses an oil tank structure placed inside the bypass duct of a turbojet. This narrow tank has a general curvature which matches an internal wall of the turbine engine. Such a structure offers optimum compactness while offering a substantial internal volume. Yet, the precision of measuring the level of fluid in this shape remains limited.

Although great strides have been made in the area of the measurement of the liquid level in turbine engine tanks, many shortcomings remain.

DETAILED DESCRIPTION OF THE PREFERRED EMBODIMENT

Figure 1:
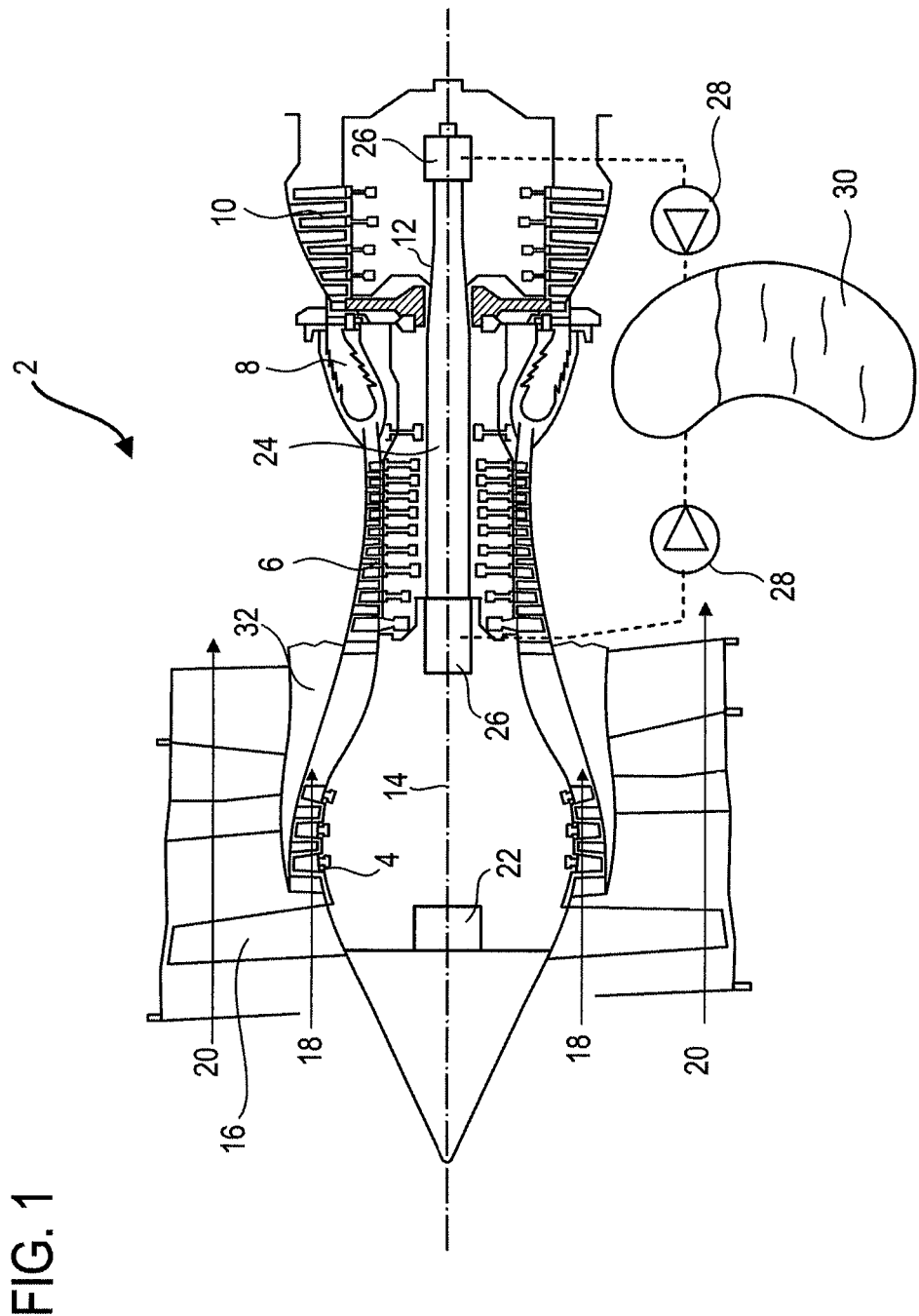
FIG. 1 shows an axial-flow turbine engine according to the present application.

The present application aims to solve at least one of the problems presented by the prior art. More precisely, the aim of the present application is to optimize the measuring precision and the simplification of integrating an oil measuring sensor in a curved tank. Another aim of the present application is to propose a solution that is light, cost-effective, reliable, easy to produce, convenient to maintain, and easy to inspect.

The subject matter of the present application is an assembly for an oil tank of a turbine engine, particularly of an aircraft turbojet, the assembly including an oil tank with an external wall forming a generally curved main cavity, wherein the main cavity contains an arched sensor for electrically measuring the oil level, said arched sensor matching the curvature of the main cavity, and sensor internal supporting arms disposed along the arched sensor, and/or an arched sleeve with an arched cavity in which the arched sensor is disposed.

According to advantageous embodiments, the assembly can comprise one or more of the following features, taken separately or according to all of the possible combinations:

The sensor supporting arms extend from the external wall toward the inside of the main cavity.

The sensor supporting arms comprise holding surfaces arranged along the arched sensor.

The main cavity has a main elongation and a main curvature along said main elongation.

At least one or more or each supporting arms comprises an arm extending from the arched sensor to the external wall, possibly perpendicularly.

The sensor supporting arms comprise guides surrounding the arched sensor, the guides possibly comprising centring surfaces.

The sensor supporting arms are distributed along the arched sensor and/or along the curvature of the main cavity.

The main cavity comprises two first sections defining a space therebetween, and a section inserted between the first sections, the inserted section being mainly or totally outside said space.

The sleeve is hinged, particularly using pivot connections.

The sleeve comprises cut-outs.

The cut-outs divide the sleeve into several segments that are mobile with respect to one another.

The sleeve is connected to the external wall via the supporting arms or directly.

The sensor comprises an electrical conductor configured to be electrically powered such as to measure the oil level, particularly by being in electrical contact with the oil.

The cavity generally has a bent cylinder shape.

The supporting arms are distributed over the majority or substantially the entire length of the sensor.

The sensor supporting arms and/or the sleeve describe an arc matching the curvature of the tank.

The arched sensor is mostly rigid.

The arched sensor is elastically deformed in the cavity.

The sensor and the supporting arms are inside the cavity, and/or are surrounded by the wall.

The volume of the main cavity is greater than or equal to: 30 litres, or 45 litres, or 70 litres.

The height of the cavity is greater than or equal to: 50 cm, or 60 cm, or 70 cm.

The curvature of the cavity, particularly the main curvature thereof, and/or the sensor describe an arc of at least: a tenth, or a sixth, or a quarter turn, and possibly less than a semicircle.

The cavity and the sensor comprise main radii of curvature that are equal, or different by at most: 20%, or 10%, or 5%.

The radius of curvature of the cavity, particularly the main curvature thereof, is between 0.30 m and 2.00 m, or between 0.50 m and 1.00 m.

The radius of curvature of the sensor is between 0.30 m and 2.00 m, or between 0.50 m and 1.00 m.

The arched sensor is configured to measure the capacitance of the oil volume in the main cavity in order to determine the volume thereof.

The sensor comprises two fitted tubes which are electrically conductive and electrically insulated from one another, the tubes being intended to measure the electric resistance of the oil in order to assess the volume thereof.

The sleeve extends over the majority or substantially the entire length of the sensor.

The sensor comprises cut-outs generally perpendicular to the elongation of the sleeve.

The segments comprise pivot connections connecting them to one another.

The cut-outs overlap one another along the circumference of the sleeve.

Another subject matter of the present application is a turbine engine, particularly an aircraft turbojet that can operate with a negative vertical acceleration, comprising an oil tank assembly, wherein the assembly is in accordance with the present application, and possibly the assembly comprises a module for measuring the temperature of the oil, said module being particularly combined with the arched sensor.

According to an advantageous embodiment, the turbine engine comprises an annular primary jet and an annular secondary jet, the tank being disposed between said annular jets.

According to an advantageous embodiment, the turbine engine comprises an annular body separating the primary air flow from the secondary air flow, the tank being disposed in the radial thickness of said body.

According to an advantageous embodiment, the turbine engine comprises an annular housing, the tank matching the annular casing over at least: 20°, or 30°, or 40°.

The subject matter of the present application is a method for mounting a liquid level sensor in a tank of a turbine engine, particularly of an aircraft turbojet, the method comprising the following steps: (a) providing or producing a tank with an external wall forming a generally curved main cavity; (b) providing or producing a level electrical measuring sensor; characterized in that, inside the main cavity, the tank comprises sensor supporting arms and/or an arched sleeve, the method further comprising a step: (c) inserting the sensor into the cavity while coming into contact with the sensor supporting arms and/or with the arched sleeve such as to match the curvature of the cavity, and at the end of the insertion step (c), the tank and the sensor possibly form an assembly according to the present application.

According to advantageous embodiments, the method can comprise one or more of the following features, taken separately or according to all of the possible combinations:

In the step (b) for providing or producing a sensor, the sensor is straight, and during the insertion step (c), the sensor is deformed such as to arch it.

During the insertion step (c), the sensor is gradually arched as it enters into contact with the sensor supporting arms and/or with the arched sleeve.

In the step (b) for providing or producing a sensor, the sensor is arched according to a radius of curvature, and during the insertion step (c), the sensor retains the radius of curvature thereof.

The tank comprises an opening, particularly a filling upper opening, and during the insertion step (c), the sensor is inserted via said opening.

In the insertion step (c), the tank is mounted on a turbine engine, particularly a turbine engine according to the present application.

In the insertion step (c), the centring surfaces deflect the sensor toward the inside of the supporting arms.

The level measuring sensor is an oil level measuring sensor.

The tank is an oil tank.

Generally, the advantageous embodiments of the present application can also be used for other subject matters of the present application. Each subject matter of the present application can be combined with the other subject matters, and the subject matters of the present application can also be combined with the embodiments of the specification, which can furthermore be combined with each other, according to all of the possible combinations, unless explicitly specified otherwise.

The present application makes it possible to produce a large-capacity oil tank in a reduced space, while preserving the accuracy for measuring the level. Indeed, the tank can be curved as desired since the sensor can sweep along the entire height thereof despite the obstacle formed by the locally concave wall thereof. Thanks to the supporting arms and to the sleeve, the position of the sensor can be adjusted in spite of the presence of other equipment. In particular, the present application makes it possible to place a sensor in the tank when the curvature of the cavity could block a straight sensor.

Moreover, the sensor can be moved away from some equipment which affects the measurement, or the consistency of the oil. An offset with respect to an oil outlet or inlet can be optimized, for example due to the abrasive nature of the oil. The sleeve can be understood to be a, or being part of the, sensor support.

In the following description, the terms "internal" and "external" refer to a positioning with respect to the axis of rotation of an axial-flow turbine engine. The axial direction corresponds to the direction along the axis of rotation of the turbine engine. The radial direction is perpendicular to the axial direction.

FIG. 1 shows an axial-flow turbine engine in a simplified manner. In this specific case, it is a turbofan suitable for the flight of a plane.

The turbojet 2 comprises a first compression stage, called a low-pressure compressor 4, a second compression stage, called a high-pressure compressor 6, a combustion chamber 8 and one or more stages of turbines 10. In operation, the mechanical power of the turbines 10 that is transmitted to the rotor 12 moves the two compressors 4 and 6. The latter include several rows of rotor blades associated with rows of stator blades. The rotation of the rotor about the axis of rotation 14 thereof thus makes it possible to generate an airflow and to gradually compress it as far as the inlet into the combustion chamber 8.

An intake ventilator commonly referred to as a fan 16 is coupled with the rotor 12 and generates an air flow which is divided into a primary air flow 18 passing through the various aforementioned stages of the turbine engine, and a secondary air flow 20 passing through an annular duct. Step-down arms, such as an epicyclic reduction gear 22, can reduce the speed of rotation of the fan 16 and/or of the low-pressure compressor 4 with respect to the turbine 10 associated stage. The drive shafts 24 are articulated via bearings 26 lubricated via an oil circuit specific to the turbine engine. Pumps 28 of the circuit direct the oil toward a tank 30.

In operation, the oil is loaded with air and with metal particles. The temperature thereof close to 200° C. increases the corrosive nature thereof. Moreover, the tank 30 can be subject to negative G, which requires that each piece of equipment, including the vent, is configured to prevent loss of oil.

The installation of the tank 30 is in this case representational. In reality, it can be mounted on the fan casing, and more preferably inside the stator 32 that separates the primary air flow 18 from the secondary air flow 20, which are channelled by a primary jet and a secondary jet, respectively.

Figure 2:
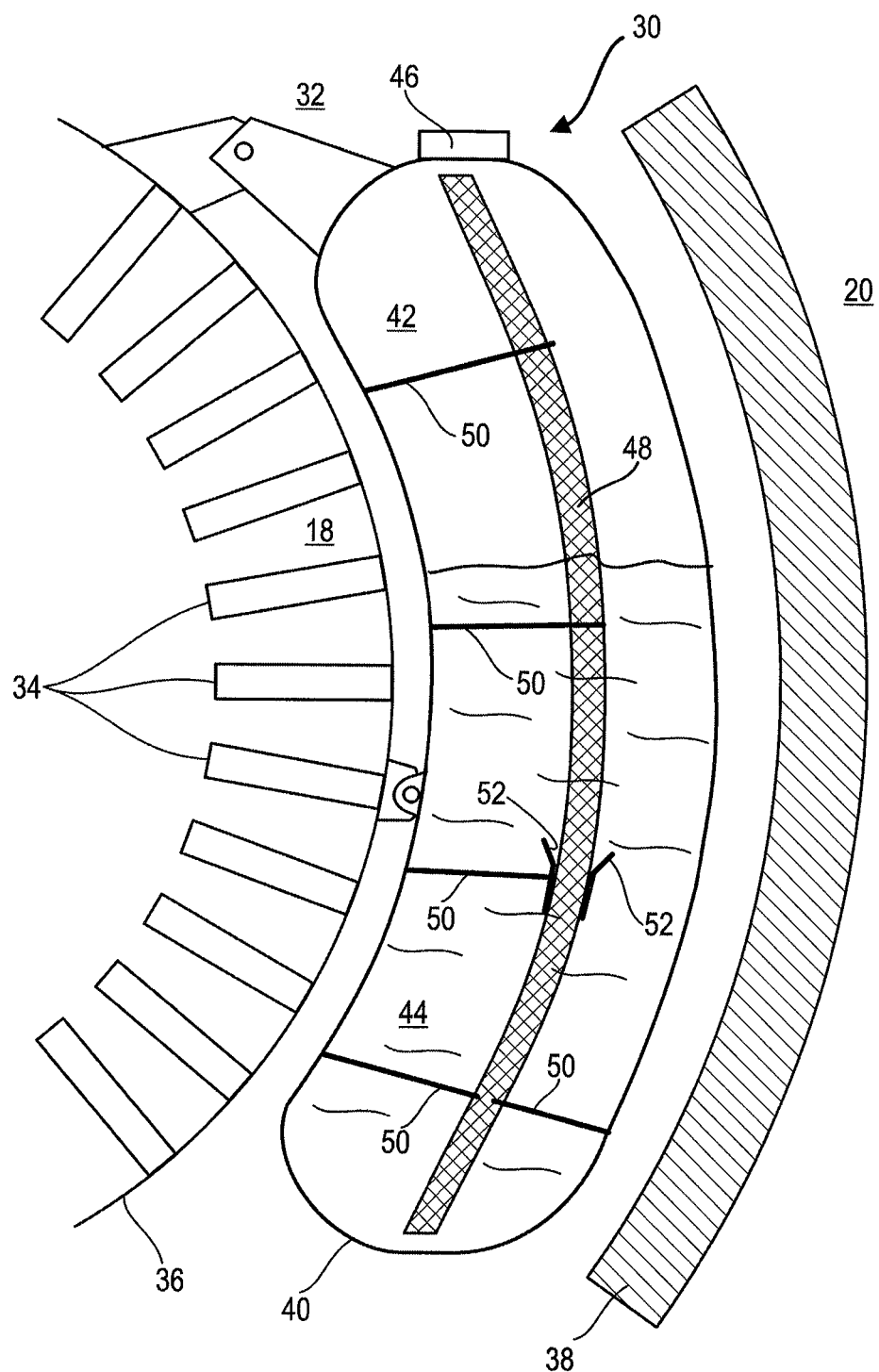
FIG. 2 illustrates a tank according to a first embodiment of the present application.

FIG. 2 is a sectional view of an oil tank 30 of an axial-flow turbine engine such as that of FIG. 1. The stator 32 and compressor blades 34 which are fixed thereto are shown, as are the primary air flow 18 and secondary air flow 20. The tank 30 can be housed between a compressor casing 36, and a partition 38 guiding the secondary air flow 20. The rotor is not shown for clarity reasons.

The tank 30 is generally curved. The general contour thereof is bowed in order to fit into the circular stator 32 of the turbine engine. The outer wall 40, or shell, comprises a radially inner incurved surface, for example facing the compressor casing 36. On the opposite side, the surface thereof, particularly facing the partition 38, is bulged, for example according to two radii of curvature.

The tank 30 includes a generally closed main internal cavity 42. The latter can store at least 60 litres of oil 44. The cavity 42 is generally curved. It can generally have a main direction, for example along the vertical direction in the normal mounting direction. The cavity 42 can generally form an arcuate cylinder, for example along a same radius of curvature. The top of the tank 30 can be identified via a plug 46 associated with a corresponding opening.

In order to measure and/or assess the level of oil 44 in the tank, a measuring system includes an electric sensor 48 immersed in this liquid, and a computer for running a computer program. The sensor 48 is generally arched, for example along a constant radius of curvature. It follows the curved shape of the tank, as well as the main curvature of the cavity. The main curvature is the curvature having the greatest radius of curvature. The sensor 48 extends over the majority or over the entire length, in this case the height of the cavity 42. Thus, it can be in contact with the oil in substantially the entire useful volume of the cavity 42.

The sensor 48 can comprise one or more electrical electrodes coming into electrical contact with the oil. It can be capacitive and/or resistive; it can measure the capacitance and/or the electric resistance, respectively, of the oil. In this last configuration, it can be provided with two coaxial and fitted tubes. These tubes measure the electric resistance of the oil in the annular space separating them.

Additionally, the tank 30 comprises supporting arms 50, particularly internal supporting arms, in that they are placed inside the cavity. The function of the supporting arms 50 is to hold the sensor 48 inside the cavity. The supporting arms 50 can be arranged along the sensor 48. They can be evenly distributed. They can form arms perpendicular to the wall 40 and/or to the sensor 48. Some supporting arms, for example the two bottom supporting arms, can be diametrically opposite with respect to the sensor 48.

Each supporting arm 50 can comprise a loop, particularly at an end, into which the sensor 48 is slid. Each supporting arm 50 can comprise a surface for holding the sensor 48. The meeting of the holding surfaces can describe or follow the curvature of the cavity 42. At least one or more or each supporting arms 50 can comprise a guide 52. Such a guide 52 can be conical, for example like a funnel, and can expand toward the plug 46, namely upward. Each guide 52 can comprise a centring surface bringing the sensor back toward the centre of the supporting arms passage during the insertion thereof. These guide surfaces prevent incorrect mounting of the sensor in spite of the constraint of blind mounting. Thus, they are "mounting error-proof" in nature.

The tank 30 can comprise elements for fixing (not shown) the sensor 48. These elements can be associated with the wall 40 and/or with the supporting arms 50. They make it possible to immobilize the sensor 48 thereat in spite of the movements of the oil 44 and the vibrations.

Figure 3:
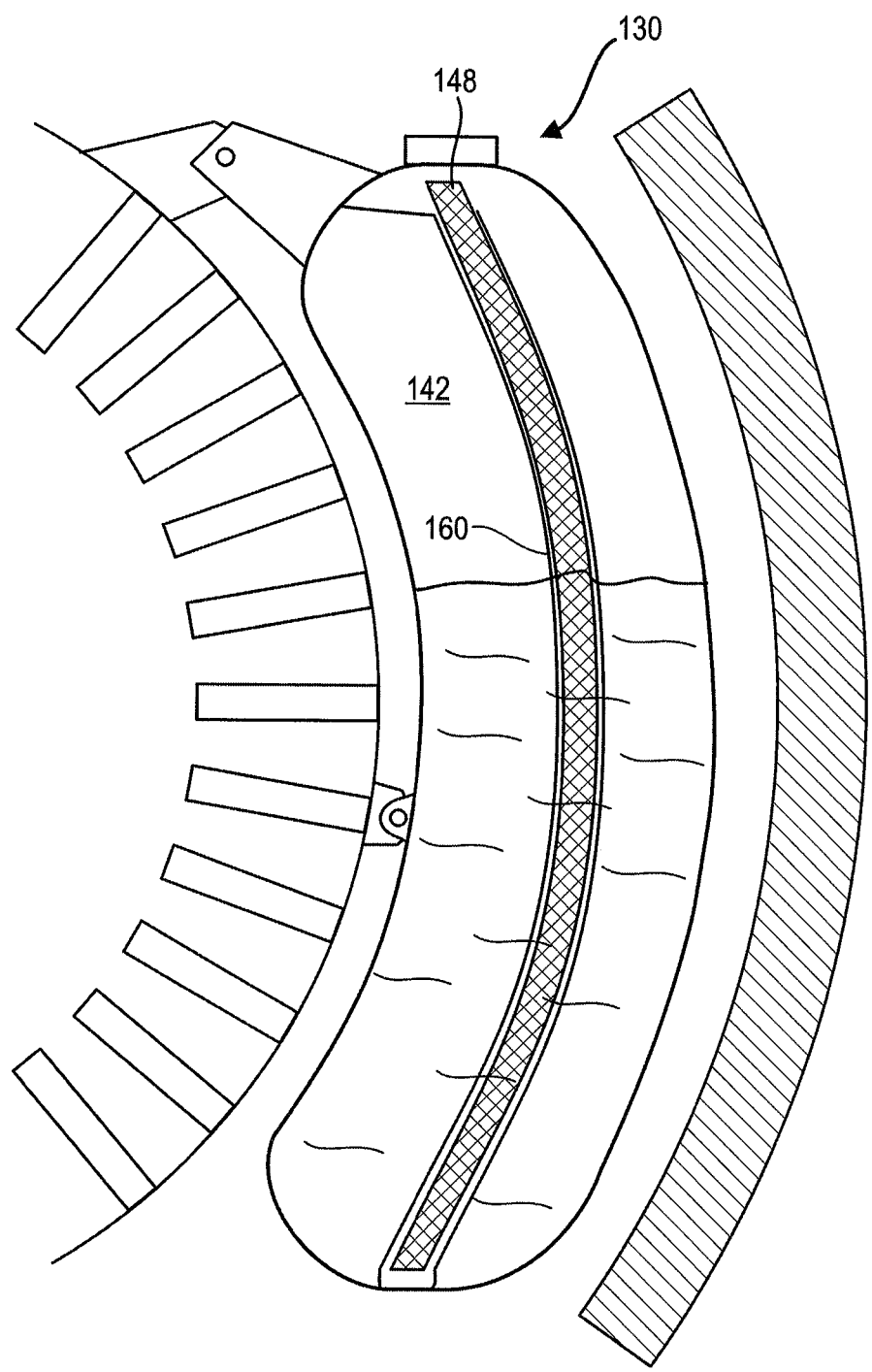
FIG. 3 illustrates a tank according to a second embodiment of the present application.

FIG. 3 outlines the tank 130 according to a second embodiment of the present application. This FIG. 3 reuses the numbering of the preceding figures for identical or similar elements, however with the numbering being incremented by 100. Specific numbers are used for elements specific to this embodiment.

The reservoir 130 includes an arched sleeve 160. The latter is placed in the cavity 142. It can extend continuously over the majority or over substantially the entire length, for example the height, of the cavity 142 and/or of the sensor 148. The sleeve 130 can be apertured to facilitate the inlet and the outlet of the oil, such as to come into contact with the sensor 148.

The cavity of the sleeve 160 receives the sensor 148. They can be adjusted with respect to one another in order to fasten the sensor. The fixing elements can supplement this fastening. The sleeve 160 can be fixed at least at one or at each of the opposite ends thereof. These ends, for example lower and upper, can correspond to those of the cavity 142.

Possibly, the sleeve is split into two parts, for example an upper part and a lower part.

Possibly, the sleeve can be held by the supporting arms such as those of the first embodiment of the present application. Consequently, the sensor would be held indirectly by the supporting arms since it is firstly in contact with the sleeve.

The sensor can be held in a combined manner, i.e. both via the supporting arms of the first embodiment of the present application, and via one or more sleeves of the second embodiment. For example, the upper half of the sensor is held by one or more supporting arms, and the lower half is held by a sleeve, or vice versa.

Figure 4:
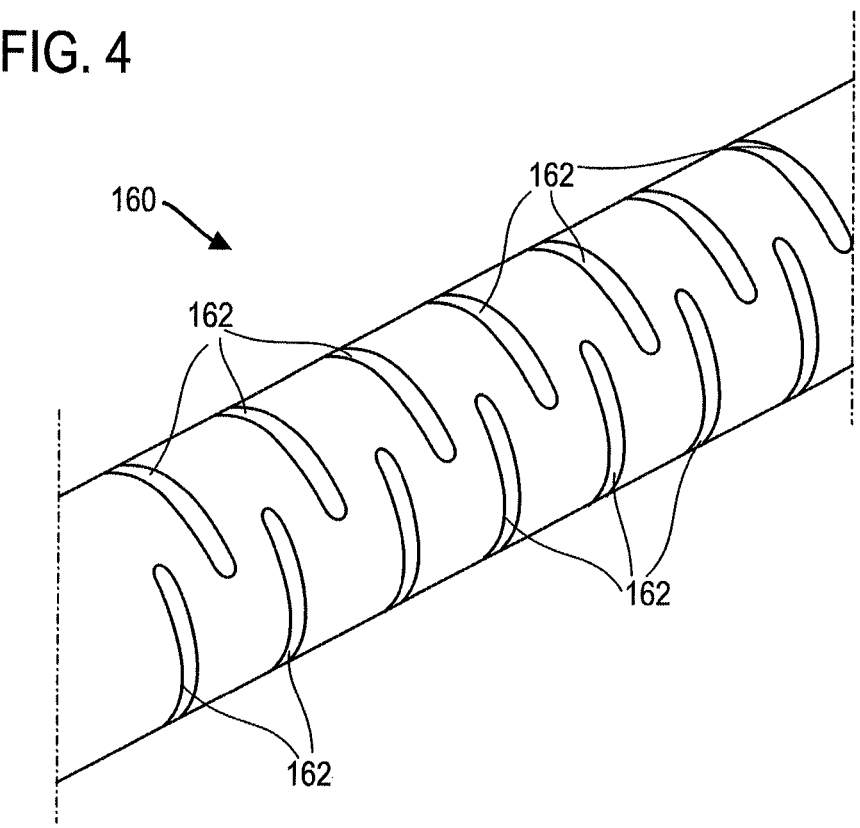
FIG. 4 outlines a sleeve according to the second embodiment of the present application.

FIG. 4 shows a sleeve 160 such as that of FIG. 3; however, the sleeve 160 is shown in a straight, and not arched, configuration.

The sleeve 160 is generally tubular. It can be made more flexible using cut-outs 162 which further improve the flow of the oil through the skin thereof. The cut-outs 162 are distributed, possibly homogenously, over the length of the sleeve 160. The cut-outs 162 can be arranged perpendicular to the axis of the sleeve 160, therefore to the principle elongation of the sleeve. However, they can be inclined with respect to the axis. The cut-outs 162 can overlap along the circumference in order to increase the flexibility.

The sleeve 160 shown in this case can be produced from an extruded tube. It could also be made from another type of tube, or from a square profile. After producing the cut-outs 162, particularly by laser, it can be bent in order to assume the curvature shown in FIG. 3.

Figure 5:
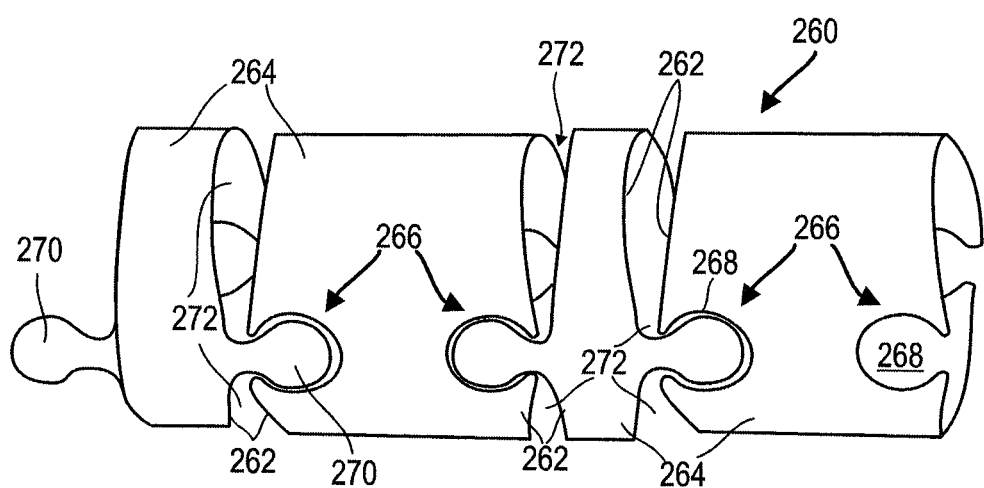
FIG. 5 outlines a sleeve according to a third embodiment of the present application.

FIG. 5 shows a sleeve 260 according to the third embodiment of the present application. This FIG. 5 reuses the numbering of the preceding figures for identical or similar elements, however with the numbering being incremented by 200. Specific numbers are used for the elements specific to this embodiment.

The cut-outs 262 divide the sleeve 260 into several mobile segments 264. Each cut-out 262 describes a closed loop around the sleeve 260. The segments 264 are hinged and mobile with respect one another. They can comprise pivot connections 266 which allow them to be attached to one another, and thus to form a chain. The pivots 266 can be formed via notches 268 receiving heads 270. The rounded contours thereof help the pivoting movement. The necking of the notches 268 coupled with the narrowing of the heads 270 allow retention along the axis of the sleeve 260. The heads 270, like the notches 268, and therefore the pivots, can be formed thanks to the cut-outs 262, which are advantageously produced by laser.

The sleeve 260 is shown in this case in a straight configuration. The cut-outs form slots 272 which expand with distance from the pivot connections 266. In this way, the pivoting movement can be blocked, and the radius of curvature assumed by the sleeve 260 can be limited. This makes it possible to maintain the sleeve arched shape depicted in FIG. 3.

The two types of sleeves depicted above can be combined. A sensor area can be maintained via the sleeve of the second embodiment, another area can be maintained by the sleeve of the third embodiment.

Figure 6:
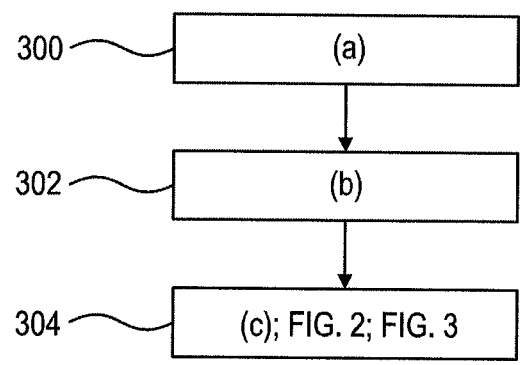
FIG. 6 is a diagram of a method for mounting a level sensor in a tank according to the present application.

FIG. 6 is a diagram of a method of assembling a tank according to the present application, which is also a method of mounting a level sensor in a turbine engine tank. The method makes it possible to produce a tank as shown in FIGS. 1-3 and according to the alternatives, and for example with a sleeve of FIG. 4 or 5.

The method can comprise the following steps, possibly carried out in the following order:

(a) providing or producing 300 a tank with an outer wall forming a generally curved main cavity, and containing sensor supporting arms and/or one are more sleeves;

(b) providing or producing 302 a sensor for electrically measuring the level;

(c) inserting 304 the sensor into the cavity while coming into contact with the sensor supporting arms and/or with the arched sleeve such as to match the curvature of the cavity.

In the step (b) for providing or producing 302 a sensor, the sensor is straight, and during the insertion 304 step (c), the sensor is deformed such as to arch it like the cavity.

During the insertion 304 step (c), the sensor is gradually arched as it enters into contact with the sensor supporting arms and/or with the arched sleeve.

The main radius of curvature thereof decreases. At the end of the insertion 304 step (c), the tank and the sensor form a combination according to one of FIGS. 2 and 3.

In an alternative, in the step (b) for providing or producing 302 a sensor, the sensor is mostly rigid and arched along a radius of curvature which remains identical and/or constant until the end of the insertion 304 step (c).

We claim:

1. An oil tank assembly for a turbine engine, comprising:
   an external wall forming a generally curved main cavity;
   an arched sensor for electrically measuring an oil level within the main cavity, said arched sensor matching the curvature of the main cavity; and
   an arched sleeve within which the arched sensor is disposed, wherein the sleeve is hinged through pivot connections.

2. Assembly according to claim 1, wherein the sleeve is directly connected to the external wall.

3. An oil tank assembly for a turbine engine, comprising:
   an external wall forming a generally curved main cavity;
   an arched sensor for electrically measuring an oil level within the main cavity, said arched sensor matching the curvature of the main cavity; and
   an arched sleeve within which the arched sensor is disposed, wherein the sleeve comprises:
   cut-outs, wherein the cut-outs divide the sleeve into several segments that are mobile with respect to one another.

4. Assembly according to claim 3, wherein the sleeve is directly connected to the external wall.

5. Method for mounting a liquid level sensor in a tank of a turbine engine, the method comprising:
   (a) providing a tank with an external wall forming a generally curved main cavity;
   (b) providing an electrical, level measuring sensor that is arched along a radius of curvature, and disposing sensor supporting arms or an arched sleeve inside the main cavity;
   (c) inserting the sensor into the cavity while contacting the sensor supporting arms and/or with the arched sleeve such as to match the curvature of the cavity,
   wherein during the insertion step (c), the sensor retains its radius of curvature.

6. Method according to claim 5, wherein the tank comprises an opening, particularly a filling upper opening, and during the insertion step (c), the arched sensor is inserted via said opening.

* * * * *